Figure 1:
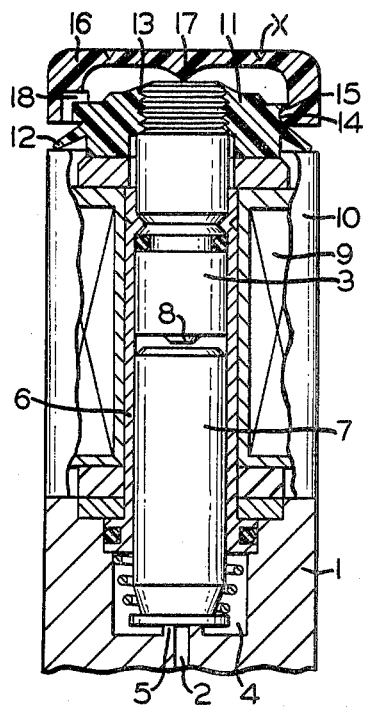

United States Patent [19]

Möller

[11] 4,417,717
[45] Nov. 29, 1983

[54] PRESSURE RELEASE FOR A VALVE

[75] Inventor: Rudolf Möller, Gehrden, Fed. Rep. of Germany

[73] Assignee: WABCO Steuerungstechnik GmbH & Co., Hanover, Fed. Rep. of Germany

[21] Appl. No.: 218,399

[22] Filed: Dec. 19, 1980

[30] Foreign Application Priority Data

Jan. 17, 1980 [DE] Fed. Rep. of Germany ....... 3001538

[51] Int. Cl.³ .............................................. F16K 31/02
[52] U.S. Cl. ............................... 251/139; 137/625.65; 137/797; 251/141
[58] Field of Search .......................... 137/625.65, 797; 251/139, 141

[56] References Cited

U.S. PATENT DOCUMENTS

| | | | |
|---|---|---|---|
| 802,950 | 10/1905 | Waterman | 251/139 X |
| 2,569,751 | 10/1951 | Dube et al. | 137/625.65 X |
| 2,799,293 | 7/1967 | Clay | 137/625.27 X |
| 3,172,637 | 3/1965 | Adams et al. | 251/139 X |
| 3,185,177 | 5/1965 | Brandenberg et al. | 251/139 X |
| 3,236,494 | 2/1966 | Frantz | 251/139 X |
| 3,324,889 | 6/1967 | Batts | 137/625.65 |
| 3,377,046 | 4/1968 | Frantz et al. | 251/139 |
| 3,670,274 | 6/1972 | Ellison | 251/141 X |
| 3,908,700 | 9/1975 | Debaye | 137/625.65 |
| 3,977,436 | 8/1976 | Larner | 137/625.65 |

Primary Examiner—Gerald A. Michalsky
Attorney, Agent, or Firm—G. J. Falce

[57] ABSTRACT

A solenoid-operated pneumatic valve in which the air vent tube has a nut threaded onto the one end thereof. A first sealing portion of the nut engages the solenoid valve body and a second sealing portion engages the air vent tube to prevent the entry of dirt and moisture into the area of the magnetic coil. The nut is further formed with an undercut portion over which a protective cover is snapped into position. The inside of the cover is provided with a conical portion to deflect the exhaust air for sound damping.

12 Claims, 6 Drawing Figures

PRESSURE RELEASE FOR A VALVE

The invention concerns a pressure release for a valve, according to the preamble of patent claim 1.

In order to prevent dirt and moisture from entering the valve housing or the valve itself through the air vent pipe, a sealing ring can be placed between the nut threaded on the air vent pipe and the housing, and a noise-damping porous cap can be threaded on the free end of the air vent pipe.

Of particular importance is the seal between the air vent pipe and the valve housing for electromagnetic valves, since penetration of moisture into the electromagnetic coil housing can lead to breakdown of the coil and inoperability of the valve.

A disadvantage of a pressure release with seal and noise damper, as described, is that several components are required to, for example, secure the magnetic coil on the air vent pipe in the case of an electromagnetically operated valve, damp outlet noise, prevent penetration of moisture into the interior of the coil housing, and prevent penetration of dirt into the valve.

The problem of the invention, therefore, is to provide a pressure release of the type described at the outset, which consists of few structural components and which meets the requirements described above.

This problem is solved by the device described in patent claim 1.

A special advantage of the pressure release according to the invention is that it consists of only two structural components which can be made at low cost by injection molding, and the insertion of separate sealing rings can be eliminated in assembly, since these form a unit with one of the structural components.

Another advantage is that the special arrangement of the air outlet ducts prevents the penetration of dirt into the magnetic coil housing and valve, and the magnetic coil is simultaneously cooled.

Further advantageous developments of the invention are described in the subordinate claims.

The invention is described in more detail in the following, with the aid of the attached figures.

Figure 3:
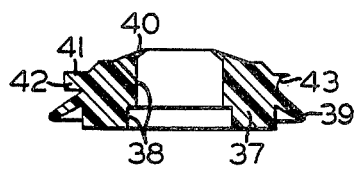
Figure 4:
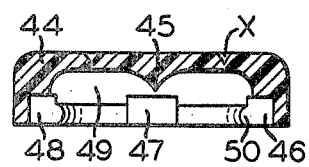
Figure 1:
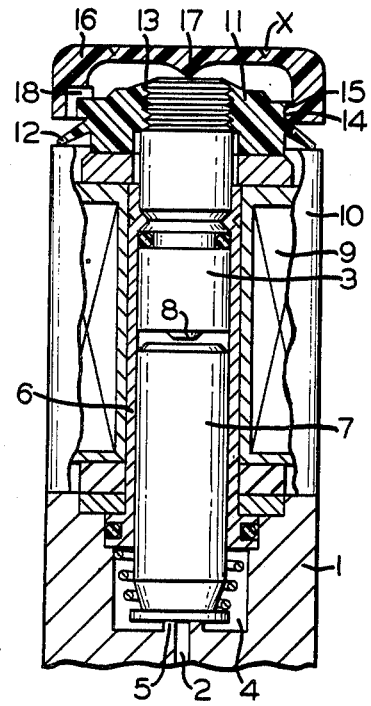
Figure 2:
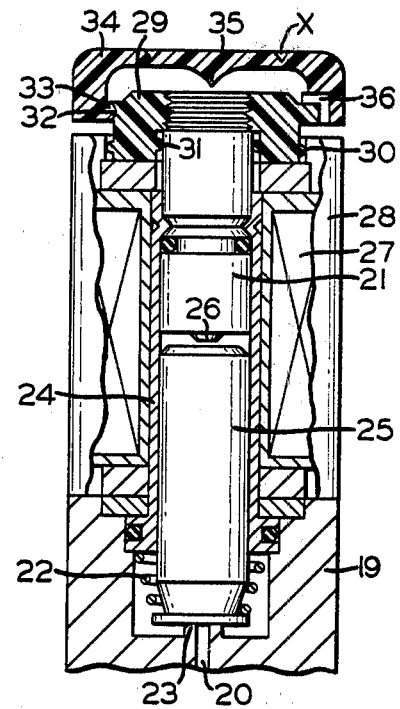
Figure 3:
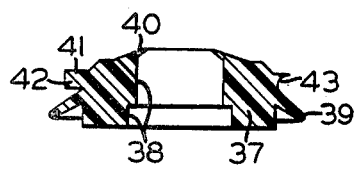
Figure 4:
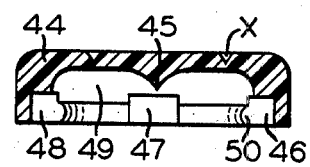

FIGS. 1,2,5 and 6: Cutaway views of a solenoid valve with nut and protective cap;

FIG. 3: Profile of nut shown in FIG. 1;

FIG. 4: Profile of protective cap;

FIG. 1 shows a cutaway view of a solenoid valve, with a pressure medium inlet 2 in a housing 1, a pressure medium outlet leading to a consuming device, not shown, and a pressure medium discharge valve 3, through which the consuming device can be connected for depressurization with the atmosphere. The pressure medium inlet 2 opens into an inlet chamber 4 and serves as a seat 5 for an inlet valve. A vent pipe, which is required as a stay tube 6 to guide an armature 7 for solenoid valves, limits the inlet chamber 4 along with the armature 7, and projects out from the housing 1 with its free end. The pressure medium outlet valve 3 is held in place in the stay tube 6 and is externally threaded on the free end projecting from the stay tube 6; the end inside the valve serves as a seat 8 for the outlet valve. Accordingly, the described end of the stay tube 6 serves as an outlet valve, which in turn accepts a nut, described below. The armature 7, together with the seat 5, forms the inlet valve, and with the seat 8, the outlet valve. The stay tube 6 is surrounded by a magnetic coil 9, the housing 10 of which is held in place axially by a nut 11 screwed onto the threads of the pressure medium outlet valve 3. The nut 11 has two sealing lips 12 and 13, whereby sealing lip 12 is pressed to the periphery of the housing 10 of the magnetic coil 9 when the nut is threaded on, and sealing lip 13 rests firmly at the outlet of the pressure medium outlet valve 3. The nut 11 has a circumferential undercut 14 above sealing lip 12. The interior threads of the nut 11 are formed only when the nut 11 is screwed onto the external threads of pressure medium outlet valve 3 for the first time. A protective cap 16, with a torus 15 on the inside edge, overlaps the undercut 14 in the form of a snap-action connection. The protective cap 16 has a conical projection 17, which creates an annular space between the cap 16 and the nut 11. This feature offers the advantage that the pressure medium is evenly deflected during depressurization an discharge noises are damped. Clearances in the walls of the protective cap 16 form air vent ducts 18, which direct the exhaust air to the housing 10 of the magnetic coil 9.

Figure 2:
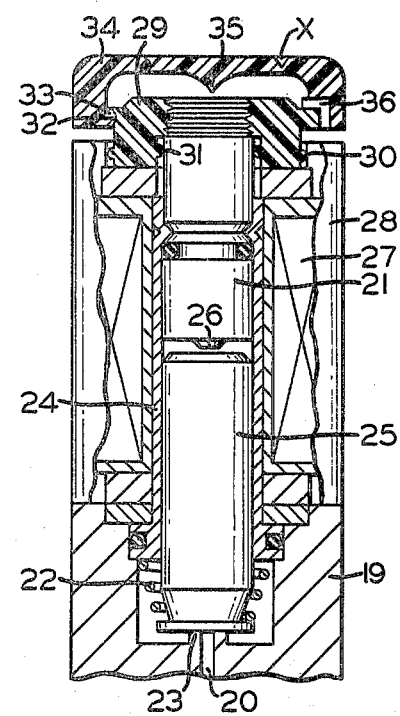

FIG. 2 shows a cutaway view of a solenoid valve, with a pressure medium inlet 20 in a housing 19, a pressure medium outlet leading to a consuming device, not shown, and a pressure medium discharge valve 21, through which the consuming device can be connected for depressurization with the atmosphere. The pressure medium inlet 20 opens into an inlet chamber 22 and serves as a seat 23 for an inlet valve. A stay tube 24, which guides an armature 25, limits the inlet chamber 22 along with the armature 25, and projects out from the housing 19 with its free end. The pressure medium outlet valve 21 is held in place in the stay tube 24 and is externally threaded on the free end projecting from the stay tube 24; the end inside the valve serves as a seat 26 for the pressure medium outlet valve. The armature 25, together with the seat 23, forms the inlet valve, and with the seat 26, the outlet valve. The stay tube 24 is surrounded by a magnetic coil 27, the housing 28 of which is held in place axially by a nut 29 screwed onto the threads of the pressure medium outlet valve 21. The nut 29 has circular sealing projections 30 and 31 on the inside as well as on the outside. Sealing projection 30 is pressed against the walls of the pressure medium outlet valve 21 and seals this area. Sealing projection 31 is pressed against the inside of the housing 28 of the magnetic coil 27 and prevents the penetration of moisture into the housing 28 and magnetic coil 27. An undercut 32 is located above the external sealing projection 31. A protective cap 34 overlaps the undercut 32 in the form of a snap-action connection. The protective cap 34 has a conical projection 35, which creates an annular space between the cap 34 and the nut 29. Clearances in the walls of the protective cap 29 form air vent ducts 36, which direct the exhaust air to the housing 28 of the magnetic coil 27.

FIG. 3 shows a sectional view of the nut from FIG. 1. A cylindrical body 37 with a stepped drill hole 38 has a circular flexible sealing lip 39 which is angled toward the lower edge of the cylindrical body 37.

A second flexible sealing lip 40, which is angled toward the stepped drill hole 38, is arranged on the upper side of the cylindrical body 37. A circumferential undercut 41 on the cylindrical body 37 is located between the two sealing lips 39 and 40.

FIG. 4 is a sectional view of a protective cap, which is placed over the nut described above and is joined with the latter by means of a snap-action connection. The protective cap 44 is made of a flexible plastic and has a conical projection 45 in the open side which creates an annular space on the inside of the cap 44. Four clearances (only three visible in the figure) 46,47,48 are built into the walls of the cap 44 to serve as air vent ducts. A torus 50 bounds the open side of the cap 44 and is a component of the snap connection.

Figure 5:
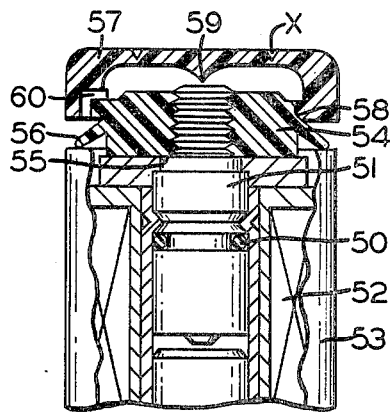

FIG. 5 shows a sectional view of the pressure medium outlet valve with stay tube, magnetic coil, nut and protective cap.

A pressure medium outlet valve 51 is held in place in a stay tube 50, with threads on the end projecting out from the stay tube 50. A magnetic coil 52 with housing 53 surrounds the stay tube 50 and is held in place by a nut 54. The nut 54 has a stepped section on the inside, which rests on a recess 55 of the pressure medium outlet valve 51. A circumferential sealing lip 56 of the nut 54, angled toward the housing 53, is pressed against the housing 53 when the nut 54 is screwed onto the threads of the pressure medium outlet valve 51. The sealing lip 56 and the stepped section of the nut 54 prevent the penetration of dirt and moisture into the housing 53 of the magnetic coil 52. A cup-shaped protective cap 57 grasps an undercut 58 in the nut 54 in the form of a snap-action connection. The bottom of the cap 57 has a conical projection 59 directed toward the pressure medium outlet valve 51.

Clearances in the walls of the cap 57 form air vent ducts 60, which direct exhaust air to the housing 53 of the magnetic coil 52.

Figure 6:
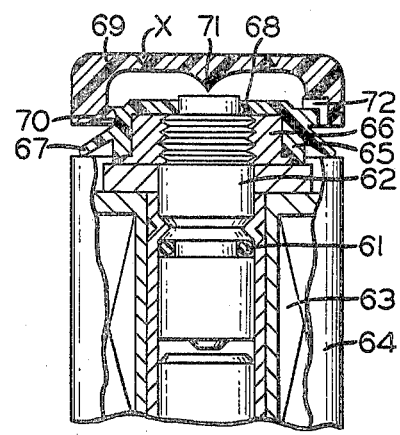
Figure 5:
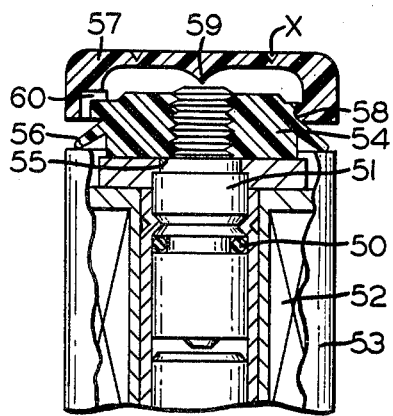
Figure 6:
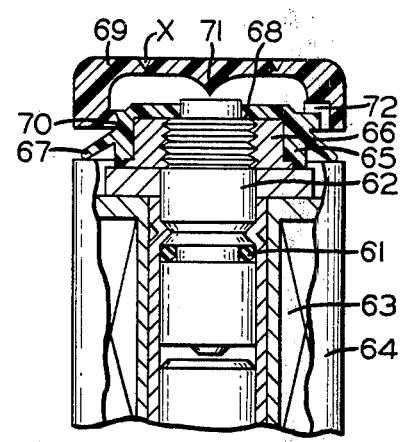

FIG. 6 shows a sectional view of the pressure medium outlet valve with stay tube, magnetic coil, nut and protective cap.

A pressure medium outlet valve 62 is held in place in a stay tube 61 with threads on the free end projecting out from the stay tube 61. A magnetic coil 63 with housing 64 surrounds the stay tube 61 and is held in place by a nut 65. The nut 65 is made of plastic and has a steel insert 66, also threaded.

A circumferential sealing lip 67, angled toward the housing 64 of the magnetic coil 63, is pressed against the housing 64 when the nut 65 is screwed onto the threads of the pressure medium outlet valve 62, thus preventing the penetration of dirt and moisture into the magnetic coil. Above the steel insert 66 of the nut 65, the plastic portion of the nut 65 projects slightly beyond the steel insert 66 and rests on a shoulder 68 of the pressure medium outlet valve 62. The seal formed by this overhang prevents the penetration of moisture into the magnetic coil 63 above the threads of the pressure medium outlet valve 62.

A cup-shaped protective cap 69 grasps an undercut 70 in the nut 65 in the form of a snap-action connection. The bottom of the cap 69 has a conical projection 71 which points toward the pressure medium outlet valve 62. Clearances in the walls of the protective cap 69 from air vent ducts 72, which direct exhaust air to the housing 64 of the magnetic coil 63.

The protective cap and nut can also be designed in one piece. The protective cap has a predetermined breaking point X to allow the cap to be pierced for the purpose of passing through a breather tube.

Having now described the invention, what I claim as new and desire to secure by Letters Patent, is:

1. An electro-magnetic valve device comprising:
 (a) a housing;
 (b) an electro-magnetic coil in said housing;
 (c) an air vent pipe secured to said housing at one end and projecting from said housing at the other end, said other end being threaded; and
 (d) a nut threadedly connected to said other end of said air vent pipe and engageable with said coil to axially secure said coil in said housing, comprising:
  (i) first annular seal means integral with said nut and projecting from the outer periphery thereof for engagement with said housing when said nut is threaded onto said air vent pipe; and
  (ii) second annular seal means integral with said nut and projecting radially inwardly from the threads of said nut for engagement with said air vent pipe.

2. An electro-magnetic valve device according to claim 1, characterized in that at least one of said first and second sealing means is in the form of a flexible sealing lip.

3. An electro-magnetic valve device according to claim 1, characterized in that said first sealing means is in the form of a flexible sealing lip (12) and is arranged in such a way that it is elastically engaged with the exterior of said housing (10) when said nut is threadedly connected.

4. An electro-magnetic valve device according to claim 1, wherein said air vent pipe comprises:
 (a) a stay tube having one end fixed to said housing and the other end projecting therefrom; and
 (b) an exhaust valve member fixedly disposed in said other end of said stay tube and having a threaded portion providing said threaded other end of said air vent pipe.

5. An electro-magnetic valve device according to claim 4, characterized in that said second sealing projection is in the form of a flexible sealing lip (13) and is arranged at the upper end of the threaded hole of said nut (11) in such a way that it is elastically engaged with the external end of said exhaust valve member when said nut is threadedly connected.

6. An electro-magnetic valve device according to claim 4, further comprising cover means for preventing the penetration of dirt into said exhaust valve member.

7. An electro-magnetic valve device according to claim 6, characterized in that said means for preventing the penetration of dirt consists of a protective cap (16,34,57,69), designed in such a way that it forms a snap-action connection with the end of said nut away from said housing.

8. An electro-magnetic valve device according to claim 7, characterized in that said protective cap (16,34,57,69) is cup-shaped and has a conical projection (17,35,59,71) which points toward the open side of said cap.

9. An electro-magnetic valve device according to claim 8, characterized in that the shell of said cup-shaped protective cap is equipped with air ducts (18,36,60,72).

10. An electro-magnetic valve device according to claim 9, characterized in that said air ducts are substantially parallel to the central axis of said protective cap.

11. An electro-magnetic valve device according to claim 7, characterized in that said protective cap (16) or (34) or (57) or (60) has a predetermined breaking point (X).

12. An electro-magnetic valve device according to claim 4, further comprising an armature movably disposed in said stay tube for engagement and disengagement with said exhaust valve member in response to energization and deenergization of said coil to provide an outlet valve to exhaust fluid pressure via said air vent pipe.

* * * * *